Inventor:
Walter L. Robb,
by [signature]
His Attorney.

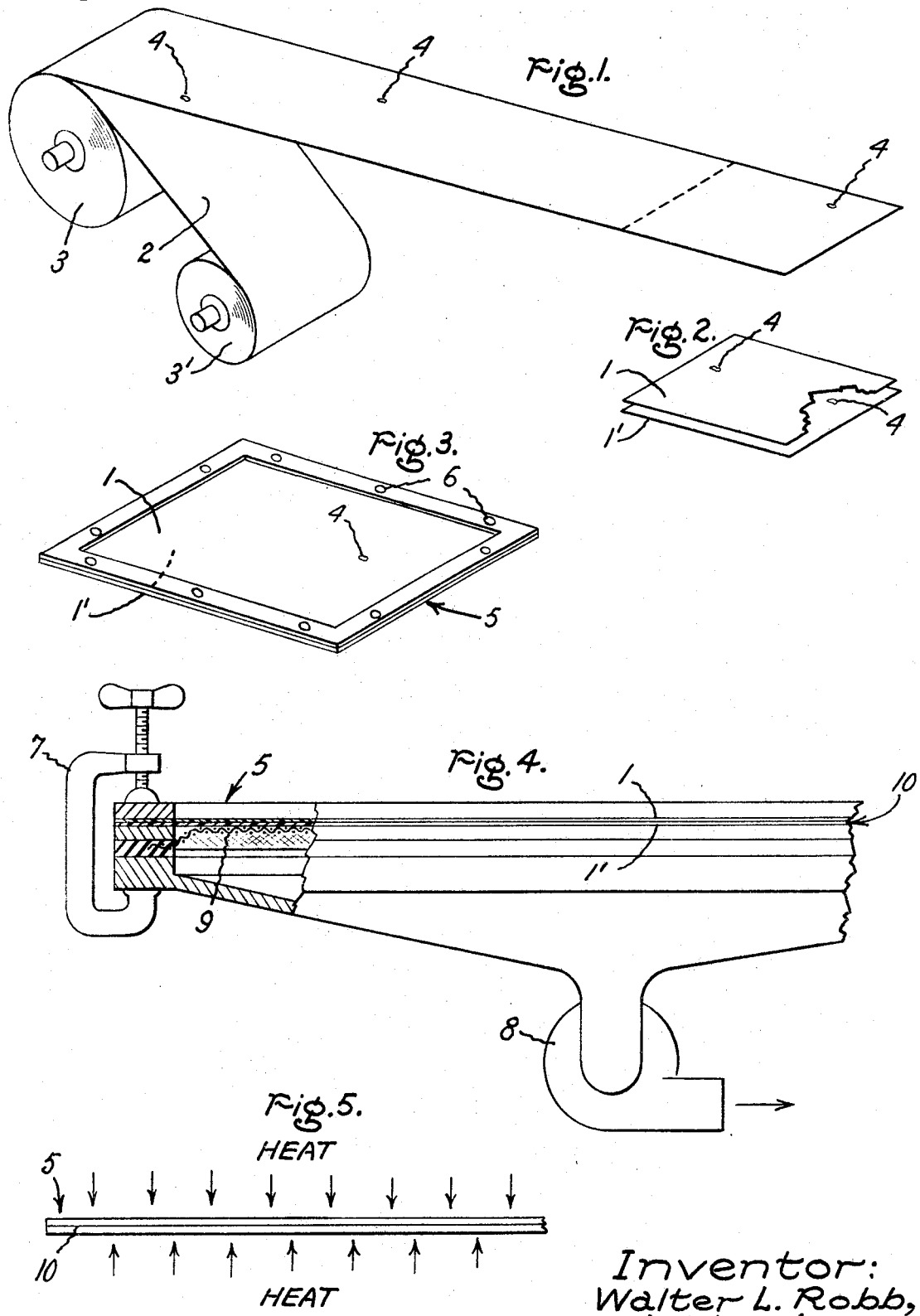

Inventor:
Walter L. Robb,
by [signature]
His Attorney.

May 5, 1970     W. L. ROBB     3,510,387
THIN, SUBSTANTIALLY DEFECT-FREE ORGANOPOLYSILOXANE MEMBRANE
Original Filed June 24, 1965     4 Sheets-Sheet 4

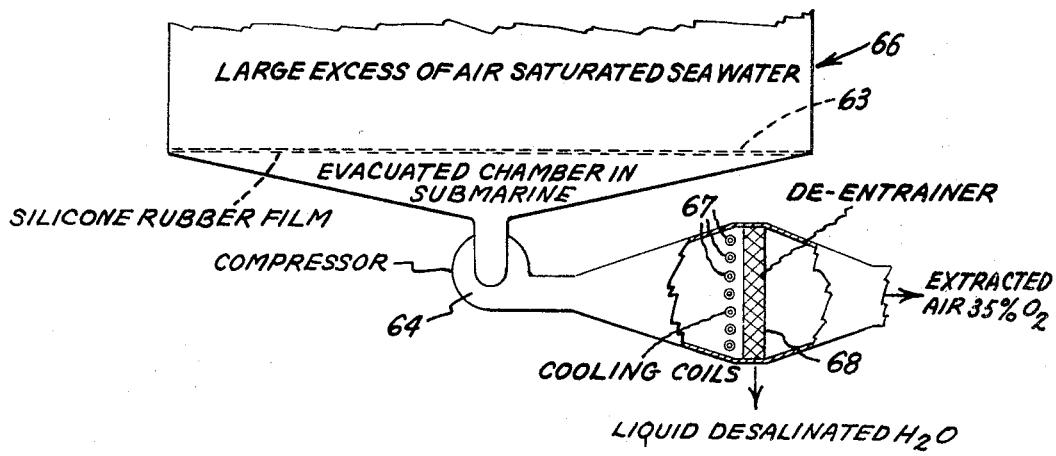

Fig. 10.
SCHEMATIC DIAGRAM OF POWERED SYSTEM FOR EXTRACTING AIR FROM SEA WATER

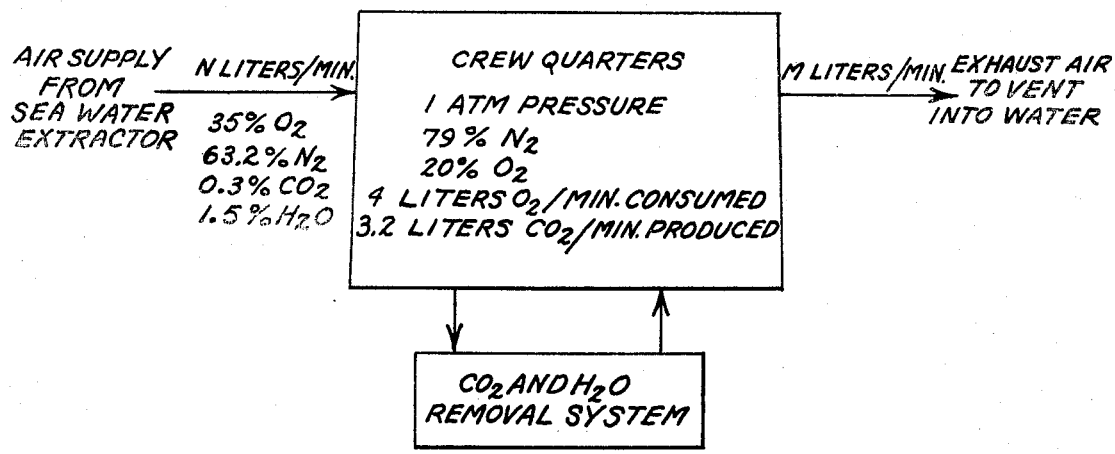

Fig. 11.
SCHEMATIC DIAGRAM OF SUBMARINE AIR SUPPLY $O_2$ BALANCE
$$0.35 \times N = 4 \text{ LITERS/MIN} + 0.20 \times M$$

$N_2$ BALANCE
$$0.632 \times N = 0.79 \times M$$
$$N = 21.1 \text{ LITERS/MIN OF } 35\% \; O_2$$

Inventor:
Walter L. Robb,
by *[signature]*
His Attorney.

3,510,387
THIN, SUBSTANTIALLY DEFECT-FREE ORGANOPOLYSILOXANE MEMBRANE
Walter L. Robb, Scotia, N.Y., assignor to General Electric Company, a corporation of New York
Original application June 24, 1965, Ser. No. 466,698, now Patent No. 3,325,330, dated June 13, 1967. Divided and this application Jan. 9, 1967, Ser. No. 608,099
Int. Cl. B32b 3/10
U.S. Cl. 161—112                                             4 Claims

ABSTRACT OF THE DISCLOSURE

A cured, solid, elastic composite membrane non-porous to gases is formed, which consists essentially of laminations of organopolysiloxane films, the total thickness of the composite membrane being less than about 2 mils.

---

This application is a divisional application of U.S. patent application Ser. No. 466,698—Robb (now U.S. Pat. 3,325,330) filed June 24, 1965. The latter application is a continuation-in-part of U.S. patent application Ser. No. 269,430—Robb filed Apr. 1, 1963 (now abandoned). Each of these related cases are assigned to the same assignee.

Silicone rubber membranes have been found to have an unusual ability to separate certain gases from mixtures of the latter and other gases. Thus, in Kemmermeyer U.S. Pat. 2,966,235, issued Dec. 27, 1960, there is disclosed a method of separating carbon dioxide from a gas mixture containing carbon dioxide and other gases, such as hydrogen, nitrogen, oxygen and helium by permeation of the gases through a thin, non-porous silicone rubber membrane. In accordance with this patent, it has been found that the thin, nonporous silicone rubber membrane will permit a much greater flow of carbon dioxide than any of the other gases mentioned above so that the permeation of carbon dioxide through this membrane is much higher than that of the other gases in relation to their relative initial concentrations. Generally, this means of separating carbon dioxide, for instance, from air, so as to obtain a residual air mixture leaner in carbon dioxide (by relative proportion) is carried out by bringing the mixture of gases containing carbon dioxide, e.g., the aforesaid air, into contact with one side of a thin, non-porous membrane of silicone rubber, causing a portion of the mixture to permeate through the membrane (under the driving force of a difference in total pressure), said permeated portion of the mixture being enriched in carbon dioxide, while the remaining air which did not permeate the membrane is depleted in carbon dioxide.

When one employs air of normal composition ($CO_2$—about .05%, $O_2$—20.95%, A—1%, $N_2$—78%) as the mixture of gases being brought in contact with the silicone rubber membrane, it will be found that when a lower total pressure exists on the other side of the membrane the mixture of gases permeating the membrane, in addition to being enriched in carbon dioxide, is also enriched to a considerable extent in its oxygen content (since silicone rubber is more permeable to oxygen than to nitrogen), while the gases which did not permeate the membrane are proportionately increased predominantly in their nitrogen content.

The amount of gas that can permeate through a membrane of a given area in a given time is, however, dependent upon its thickness, in addition to other factors such as the pressure drop across the membrane. It is, therefore, seen that optimum results can be obtained when the thinnest possible membrane, which will withstand the pressure drop across the membrane, is used.

At the present time, silicone rubber compositions can be calendered to give relatively thin films of thicknesses ranging from about 2 to 10 mils in thickness. Silicone rubber membranes of such thicknesses are ordinarily capable of effecting some separation of gases. However, it would be highly desirable to use thinner films of the silicone rubber membrane so that a smaller total area of membrane would be required to process a given amount of gas mixture.

When attempts are made to reduce the thickness of the film below 2 to 4 mils by the usual techniques heretofore known for making thin films, for example, calendering, extruding, casting from solution, etc., several difficulties are encountered. Thus, it has been found that in making membranes of even less than about 5 mils in thickness by the usual techniques, non-uniformity in thickness and pinholes occur, both of which aspects are detrimental to the utility of the film as a gas permeable membrane. In addition, tearing often occurs as the thickness of the membrane is reduced by the usual techniques because of the lack of adequate strength of the silicone rubber membrane so reduced in thickness to withstand the processing strains encountered with such techniques.

It is a prime object of this invention to provide sound, uniformly-thick silicone rubber membranes of thicknesses of less than about 2 mils.

Another object of this invention is to provide a sound, uniformly-thick silicone rubber membrane for the separation of gases, which can be mass-produced on a continuous basis in thickness ranges below about 2 mils.

Other objects of the invention will become more apparent from the discussion below.

Silicone rubber membranes of thicknesses as low as 0.1 mil fulfilling the foregoing objects have been produced by the practice of the invention disclosed in the aforemention application Ser. No. 466,698. The silicone membranes of this invention are composite structures consisting essentially of laminations of organopolysiloxane film consolidated sufficiently to be substantially free of channels interconnecting perforations in contiguous laminations, thereby rendering such membranes non-porous to gases.

The term "silicone rubber" is intended to include both filled and unfilled organopolysiloxanes which are convertible to the cured, solid, elastic state by any of the means available in the art, for instance, by heating at elevated temperatures in the presence of cure accelerators such as organic peroxides, etc., by irradiation with high energy electrons as is more particularly disclosed in U.S. Pat. 2,763,609, issued Sept. 18, 1956, etc.

The term "air" as employed herein is intended to include variations in percentages of the components from the normal mixture of gases encountered in dry atmospheric air at sea level.

The term "wall" as applied herein to describe part of an enclosure structure is intended to include any portion of the structure functioning as a separating barrier, e.g. side wall or ceiling.

The convertible organipolysiloxane or silicone rubbers used in the practice of the present invention may be in the form of highly viscous masses or gummy elastic solids, depending upon the state of condensation, the condensing agent employed, the starting organopolysiloxane used to make the convertible organopolysiloxane, etc. Although convertible organopolysiloxane with which the present invention is concerned are well known, in order to show persons skilled in the art the various convertible organopolysiloxanes, which may be employed in the practice of the present invention, attention is directed to the convertible organopolysiloxanes disclosed and claimed in Agens Pat. 2,448,756 and Sprung et al. Pat. 2,448,556, both issued Sept. 7, 1948; Spung Pat. 2,484,595, issued Oct. 11, 1959; Krieble et al. Pat. 2,457,688, issued Dec. 28, 1948; Hyde Pat. 2,490,357, issued Dec. 6, 1949; Masden Pat. 2,521,528, issued Sept. 5, 1950; and Warrick Pat. 2,541,137, issued Feb. 13, 1951.

It will, of course, be understood by those skilled in the art that other convertible oragnopolysiloxanes containing the same or different silicon-bonded organic substituents (e.g., methyl, ethyl, propyl, amyl, cyanoethyl, cyanopropyl, cyclohexyl, vinyl, allyl, phenyl, tolyl, xylyl, benzyl, phenlethyl, naphthyl, chlorophenyl, both methyl and phenyl etc., radicals) connected to silicon atoms by carbon-silicon linkages, may be employed without departing from the scope of the invention.

The particular convertible organopolysiloxane used is not critical (although completely crystalline materials will not be useful as such, because of the inability of such materials to stretch) and may be any one of those described in the foregoing patents and generally obtained by condensing a liquid oragnopolysiloxane containing an average from about 1.95 to 2.25, preferably from about 1.98 to about 2.05, silicon-bonded organic groups per silicon atom. The usual condensing agents which may be employed and which are well known in the art may include, for instance, ferricchloride hexahydrate, phenyl phosphoryl chloride; alkaline condensing agents, such as potassium hydroxide, cesium hydroxide, etc. These convertible organopolysiloxanes generally comprise polymeric diorganosiloxanes which may contain, for example, up to 2 mol percent copolymerized monorganosiloxane, for example, copolymerized monomethylsiloxane, and up to 2 mol percent vinylsiloxy units, e.g., as a methyl vinyl siloxy unit. Generally, it is preferred to use as the starting liquid organopolysiloxane from which the convertible organopolysiloxanes are prepared, one which contains about 1.98 to 2.02, inclusive, organic groups (for example, methyl groups) per silicon atom where more than about 90 percent of the silicon atoms in the polysiloxane contain two silicon-bonded dialkyl groups.

The starting organopolysiloxanes used to make the convertible organopolysiloxanes by condensation thereof preferably comprise organic substituents consisting essentially of monovalent organic radicals attached to silicon through carbon-silicon linkages, there being on the average between 1.95 and 2.25 organic radicals per silicon atom, and in which the siloxane units consist of units of the structural formula $R_2SiO$ where R is preferably a radical of the group consisting of methyl and phenyl radicals. The polysiloxane may be one in which some or all of the siloxane units are $(CH_3)_2SiO$ (e.g., octamethylcyclotetrasiloxane, tetramethyl tetravinylcyclotetrasiloxane, etc.) or the siloxane may be a copolymer of a polydimethylsiloxane and a minor amount (e.g., from 1 to 20 mol percent) of any of the following units alone or combinations thereof: $C_6H_5(CH_3)SiO$ and $(C_6H_5)_2SiO$.

The convertible organopolysiloxane may be compounded on ordinary rubber compounding rolls with various fillers, for example, silica, silica aerogel, titanium dioxide, calcium silicate, ferric oxide, chromic oxide, cadmium sulfide, asbestos, glass fibers, calcium carbonate, carbon black, lithopone, talc, etc. The amount of filler used with the convertible organopolysiloxane may be varied widely within wide limits and, on a weight basis, may be of the order of from about 0.1 to 2 or more parts filler per part convertible organopolysiloxane (or silicone gum). Various cure accelerators may be added to the silicone gum prior to formation into the starting film. Among such cure accelerators may be mentioned, for instance, benzoyl peroxide, tertiary butyl perbenzoate, bis-(2,4-dichlorobenzoyl)-peroxide, dichlorobenzoyl peroxide, etc. These curing agents ( or "vulcanization accelerators" as they are often designated) can be present in amounts ranging from about 0.1 to as high as 4 to 8 percent, by weight, based on the weight of the convertible organopolysiloxane. Alternatively, high energy electron irradiation without curing agents can also be employed for vulcanizing purposes in the same manner as described in the foresaid U.S. Pat. 2,763,609.

As an example of the preparation of the silicone membranes of this invention, a silicone gum preferably (although not essentially) containing a filler and a cure accelerator (if heat-curing is intended) is formed into a thin film of the order of from about 2.5 to 10 mils by usual means as, for example, by calendering, extruding, etc. If desired, the silicone film can be rolled onto or prepared in the presence of a support film of cellulose acetate, paper, or other support which can be readily removed. After the calendering or extrusion or other means whereby the film is prepared, the silicone rubber film is advantageously given an incomplete or partial cure such as, for instance, by heating the film for from 10 to 45 seconds at temperatures of from 125–175° C. whereby partial cure of the convertible organopolysiloxane is attained. This partial cure is desirable because it improves the strength and workability of the film so that it can be elongated in the subsequent processing to as much as 2 to 4 times or more its original dimensions (both laterally and longitudinally) without tearing. This stretching results in an increase in film area of up to 4 to 16 times the original area, and a reduction in thickness down to $\frac{1}{4}$ to $\frac{1}{16}$ the original thickness. The use of high energy radiation to effect partial cure is not precluded.

After the silicone rubber film is formed, it is inspected carefully for sizeable pinholes or tears which may have occurred during the forming operation. If the frequency of these defects is low, nothing further need be done, because in subsequent superpositioning of one film over another, these defects will be covered up. However, if considerably large defects or large numbers of defects are present in the films, these defects can be corrected by applying a small piece of the same film over the defect and relying on the cohesive properties of the film for adhesion.

Thereafter, two (or more) portions of this silicone rubber film are stretched over a frame and pressed against each other using either porous (or finely perforated) flat mechanical biasing means for effecting contacting relationship between the films and consequent exclusion of air or using air pressure or vacuum to insure intimate contact under a high pressure differential so that all air is excluded from between the contacting films. Part of the stretching can be done at the time the films are brought into contacting relationship and part of the stretching can be done after the films are in contacting relationship. If desired, the entire stretching can be done at the time air-free contacting relationship is established or immediately prior to final cure.

The main reason for insuring the complete elimination of air from between the films is that thereby any possibility of "channeling" along the contact interface, whereby air present there may couple holes in the contacting films not otherwise lined up, is eliminated. Such "channeling" permits gases to short-circuit through the film destroying its value as a permeable barrier.

The step of placing the films in contact and drawing the films simultaneously at least during the latter stage of the stretching is particularly beneficial, because in this way the films lend to each other support against being drawn overly thin in any given spot. The poor resistance of any given portion of one film due to holes or over-thinness is bolstered by the full thickness of the other film adjacent thereto, since it is unlikely that both opposed films will have markedly reduced thickness in the same place. This mutual support is promoted by the tacky nature of these films whereby they tend to form and retain their contact relationship without the need for interposing a foreign bonding phase.

Since the resulting composite film is at least doubled in thickness (as a result of effecting the contacting relationship), the composite film can be stretched to a much greater extent than any individual component film in the partially cured or uncured state. In the partially cured (or totally uncured) state, the stretching that may be effected may be anywhere from about 50 to 500 percent or even more in each direction (to produce film thicknesses of from about 0.1 to about 2 mils) without adversely affecting the properties of the ultimate film. Generally, the degree of stretching at this point can be varied quite widely in order to accommodate the application desired, the particular organopolysiloxane film involved, filler, degree of cure, etc.

After this stretching, and while being maintained with the stretched, intimate air-free contacting relationship between component films, the double film (or if desired, a plurality of contacting films) is then given the final cure either by heating again at elevated temperatures such as for ½ hour at 175° C. or higher, or by means of irradiation with high energy electrons. This curing simultaneously effects cross-linking of the silicone rubber and permanent bonding between the film layers of the composite film to form a uniform, intimately-bonded air-free unified film. At the same time, the probability that undetected pinholes will be present in the unified film is greatly reduced because of the remote chance that a pinhole in one film component will be directly in line with a pinhole in the adjacent component film.

The above-described cured unified film, which is of greatly reduced thickness and is substantially free of any porosity, can now be used to particular advantage as a permselective membrane in various gas separation units, such for example, as are disclosed in the specification to follow and in the drawings wherein:

FIGS. 1 to 5 show one method of producing unbacked thin films according to this invention;

FIG. 6 describes a continuous process for making thin films of silicone rubber according to this invention in which the composite double film formed is backed only on one side with a porous support;

FIG. 10 is a schematic diagram of a system for extracting oxygen-rich air from sea water; and FIG. 11 is a flow diagram illustrating the passage of gases to and from the crew quarters of a submarine using the system shown in FIG. 10.

Figure 6:
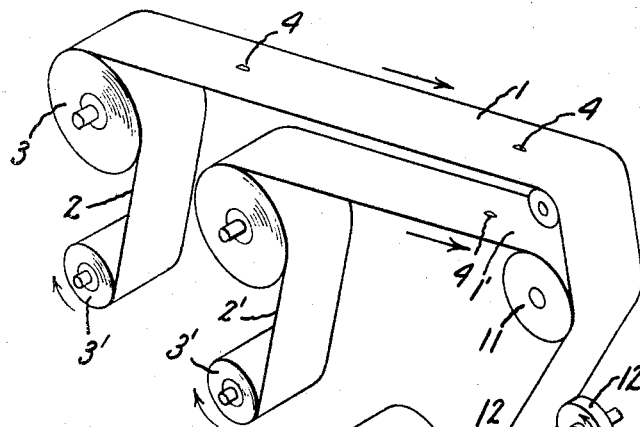

More particularly, FIGS. 1 to 5 disclose a filled silicone rubber film 1 containing a cure accelator with a backing 2 therefor unwinding from roll 3 with the backing (such as cellulose acetate) being wound back on roll 3'. The silicone rubber film will have been obtained by previous calendering or other such suitable means and by giving the silicone film a partial cure by heating as indicated previously. Any pinholes present in the calendered film may be patched as described previously with the same material from which the film itself is made. These patches 4 are readily adherent to the base film in the uncured or incompletely cured state so that a bond of sufficient strength is achieved merely by bringing the patch into intimate contact with the film.

FIG. 2 shows a cutaway view of the two films 1 and 1' superposed on each other prior to establishing contacting relationship; the lack of coincidence of the holes in the films is shown in this view.

Thereafter, as shown in FIG. 3, the dual films 1 and 1' are stretched from about 25 to 500 percent (in one or both directions) and in this stretched condition are clamped together by means of a frame 5 held in place by screws 6. This frame and film are held by clamps 7 (only one being shown) over the evacuating apparatus 8 as shown in FIG. 4 whereby the two films 1, 1', supported on porous screen 9, are forced into intimate contact over their entire contact area by the removal of air from between the films by the application of a vacuum by the evacuating apparatus beneath the films. This application of a pressure gradient to the films effects the elimination of air from between the films by permeation. The consolidated film 10 in the stretched, clamped state is then cured as shown in FIG. 5 by any of the means recited previously, for instance, by heating at temperatures from about 150 to 250° C. for times ranging from about 2 minutes to 2 hours or more to yield a cured, stretched, consolidated thin film, which then can be used as a permselective membrane of increased effectiveness, because of its combined qualities of extra thinness and freedom from perforations.

Preferably at least the final stretching of films 1, 1' is not effected until the films have been brought into such intimate contact as to eliminate air from between the films either by permeation through one film (by the application of a high pressure gradient as in FIG. 4) or by permeation through both films (by the inwardly direction of pressure on both outer faces of films 1, 1' by means of porous metal plates or structural means with very fine perforations therethrough).

Whereas, if the stretched composite film 10 were released without first curing the silicone rubber, the material would revert to its earlier area, it has been found that the stretched film, when cured, does not shrink or at most shrinks only a small amount upon removal of the restraining force as the stress of stretching is relaxed by the curing step.

FIG. 6 shows a continuous process for making a composite double film prepared from two component films and backed on one side by a porous support mat of material such as cloth or paper. More particularly, calendered, incompletely cured silicone rubber film 1 (of about 2 to 5 mils thick) is unwound together with a supporting or backing film 2 (e.g., cellulose acetate) from an unwinding roll 3. As the calendered silicone rubber film unwinds, the supporting film (used in making the calendered silicone rubber film) is removed by means of a take-up roll 3' so that only the silicone rubber film continues along the path over the roll 11. At the same time, another incompletely cured silicone rubber film 1' joins film 1 in juxtaposition therewith in passing over roll 11. Before coming to roll 11 where the two films are overlayed and brought into close contact, any pinholes 4 which may be present in the individual film components can be patched in the manner described previously.

Thereafter, the composite pair of films 1 and 1', in contacting relationship with each other, are passed over film-stretching rolls 12 and are then passed over a perforated drum 13, which is attached to an evacuating apparatus 14, to draw the films together even more closely by causing removal of any air entrapped between the films. Heating element 15 positioned over the contacting films effects partial cure of the films and to effect bonding between and consolidation of the individual film plies and, likewise, between the film plies and any porous backing material. This initial partial cure and bonding can be accomplished by means of high energy radiation source (e.g. for high energy electrons) properly positioned in place of the heating element 15. Next, the unified air-free composite film is given a final and complete cure by passing it underneath heating element 16 and is then wound up on roll 10'. If desired, a porous backing 17 (e.g., paper or cloth) can be introduced at the time the two silicone rubber component films pass over the perforated drum 13. Prior to this, being brought into contact with the composite film, the adhesion of this porous support web 17 can be improved by applying a silicone primer (e.g., vinyltriethoxysilane, gamma aminopropyltriethoxysilane, etc.) to surface of the support web from a tank 18 by means of coating roll 19. Such treatment will improve the bond between the backing 17 and the composite film 10. In addition, an edging cement 20 (e.g., an uncured dispersion of a silicone rubber containing a cure accelerator) may be applied to web 17 to further insure adequate bonding to the edge of the composite silicone film.

Figure 7:
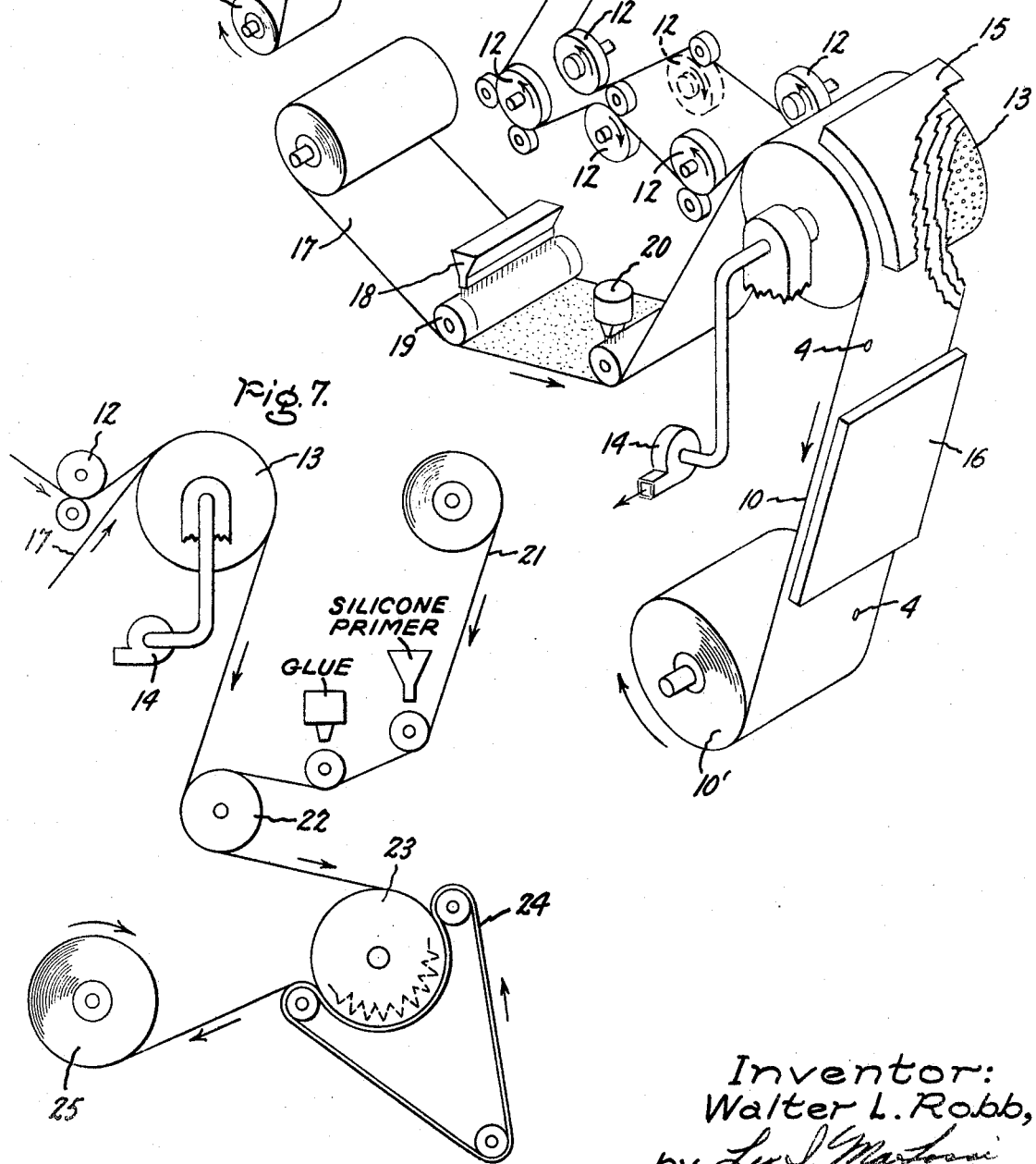
FIG. 7 shows a continuous process for making thin, doubly supported silicone rubber film according to this invention, which film is supported on both sides with a porous backing such as porous paper or cloth.

Instead of having the silicone rubber film supported only on one side, a porous support web may be applied to each side of the composite film as shown in FIG. 7. Thus, as the air-free composite film comes off perforated drum 13 with the first porous support applied thereto, a second porous backing 21 can be introduced as at roll 22 so that there will be a supporting layer applied to each side of the composite silicone rubber film. The same primer and glue may be applied and in the manner as before. The latter-applied support web 21 is secured in place and the entire assembly cured and consolidated by passing the composite film and support backings over a heated roller 23 using means, such as the endless belt 24 to press the backed film against the heated roller 23 before storage in final form on roll 25. The equipment and arrangement shown located ahead of perforated drum 13 in FIG. 6 are contemplated as part of the equipment shown in FIG. 7.

In order that those skilled in the art may better understand how this invention may be practiced, the following examples are given by way of illustration and not by way of limitation. All parts are by weight.

EXAMPLE 1

An organopolysiloxane material capable of later conversion to the cured, solid, elastic state was prepared by heating at a temperature between 110–155° C. with agitation over a period of about 4 hours, 100 parts of octamethylcyclotetrasiloxane in the presence of 0.001 part of potassium hydroxide. The resulting polydimethylsiloxane was a highly viscous, benezene-soluble mass of only slight flow, and had a ratio of approximately 2 methyl groups per silicon atom and a viscosity of about 6 million centistokes. A mixture of about 100 parts of the above-described polydimethylsiloxane and 43 parts of fume silica was milled on a rubber mill and to the resulting filler-polymer mixture was added 1.5 parts of benzoyl peroxide. This mixture of ingredients will hereinafter be referred to as "convertible methylpolysiloxane."

EXAMPLE 2

The above convertible methylpolysiloxane was calendered on a two-roll calendering mill with a backing of cellulose acetate until a silicone rubber film about 2.5–3 mils was obtained. Since this silicone rubber film was found to have several pinholes upon visual observations, the pinholes were covered with small pieces of the same calendering film (free of the backing), so that a close bond was effected between the patch and the base film. This calendered silicone rubber film, which had been given a heat treatment (to effect a light cure) for 30 seconds at 155° C. during the calendering operation, was then separated from the cellulose acetate support film, and two equal areas (9" x 9") of this silicone rubber film were superposed on each other and stretched in contacting relationship over a frame (see the accompanying FIGS. 4 and 5), so that the area of the film was increased to a size approximately 500 percent greater than the original composite film (9" x 9"). The two films were pressed against each other using air pressure to create a pressure differential to force the two component films into intimate contact. While in the stretched condition in contact with each other, the composite film was then subjected to additional heating for one hour at 175° C. to effect complete cure of the films and bonding of the individual internal surfaces of the component films to each other. Thereafter, this unified bonded composite film about 1 mil thick was placed over a form for use as a permselective membrane. When films of this thickness were used as gas separating membranes, it was found that the gases removed from the opposite sides of the membrane were greatly enriched in oxygen on the one hand and carbon dioxide on the other hand as reported in the aforesaid Kammermeyer patent, but at a rate of gas permeation through the membrane considerably in excess of the rates achieved in the past. Also, it was found when such thin films were used for the purposes described in my copending patent application Ser. No. 247,904 now Pat. No. 3,274,750 (filed Dec. 28, 1962 and assigned to the assignee of this invention) gases such as xenon and krypton could more readily be removed from mixtures of the latter gases with oxygen and nitrogen. In essence these tests established that by the practice of the method of this invention sound, perforation-free films of silicone rubber can be prepared having such reduced thickness (and thereby such an increased rate of permeability) that a very substantial reduction in requisite film area is made possible to separate a given quantity of gas per unit of time.

It will, of course, be apparent to those skilled in the art that in addition to the convertible methylpolysiloxane employed in the above example, other organopolysiloxanes as well as other fillers may be used without departing from the scope of the invention. The type of cure accelerator, the means of curing the proportions of ingredients can also be varied within wide limits.

Obviously, the procedures for curing (either partial or complete), stretching, etc., described above are not intended to be limiting aspects of the novel method as it is apparent to those skilled in the art, that deviations therefrom within the scope of the claims can be employed as effectively as those described herein.

In addition to the use of the sound, perforation-free films of uniform thickness prepared by this method in the applications described in detail below, thin films of the silicone rubber herein described can be used in industrial applications where it is desired to effect the concentration of carbon dioxide gas from gases containing the same and to separate xenon and krypton in the manner described in the aforementioned patent application. Also, these thin films may be used as part of a device for increasing the oxygen content of air to be admitted to oxygen tents used to care for heart victims. By suitable arrangements, this oxygen enrichment can be done on a continuous basis at less expense and with greater convenience than has heretofore been possible using bottled oxygen.

As shown in FIGS. 8–11, the composite silicone membranes of this invention, because of their increased effectiveness as permeable membranes, find particular application in the securing for humans (and, if desired, for animals) of safe oxygenating environments under adverse conditions. Of the apparatuses shown, permeation is effected by the application (or presence) of a difference in total pressure on the opposite sides of the permeable membrane in the structure in FIG. 10, while in the structure in FIG. 8 the driving force to effect permeation is the difference in partial pressures of the gases to be exchanged ($CO_2$ to be removed from the breathing air and $O_2$ to be added thereto).

Figure 8:
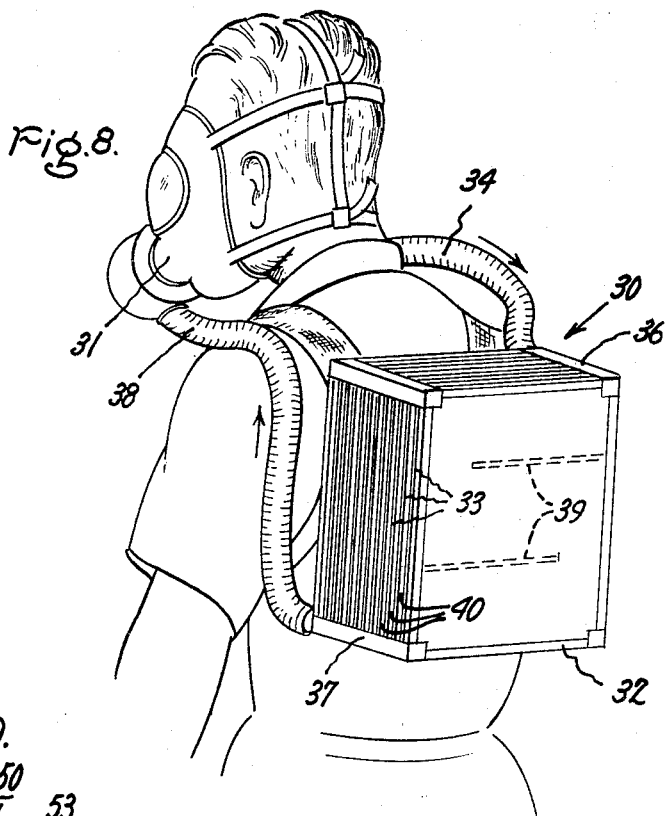
FIG. 8 is a schematic illustration of a portable permeable film pack wherein the membranes of this invention are employed for the protection of personnel, when present in atmospheres contaminated with radioactive airborne particles, germs and/or chemical warfare agents.

Thus, in FIG. 8 is shown a potrable air regenerator apparatus 30 using permselective membranes to provide breating air for an individual present in surroundings rendered hostile by chemical toxicity, germs and/or radio-activity. In essence, the apparatus 30 comprises an airtight mask 31 to which is connected a box 32 containing several square yards of the thin silicone rubber film 33 of this invention having a uniform thickness preferably in the range of from 0.1 to 1.0 mil. The range may be extended to employ films of 2.0 mils thickness, but the vast area of film that would be required by using films of greater thickness than 2.0 mils would render the device impractical. This film 33 is so arranged in box 32 that the wearer's breathing air is contained by film 33 on one surface thereof, while contaminated atmospheric air is presented to the opposite surface of film 33. The expired breathing air, which is depleted in $O_2$ and enriched in $CO_2$ and water vapor, is circulated past the permeable film via hose 34 and manifold header 36 by the normal action of the individual's respiratory muscles resulting in contraction and expansion of the lungs. As this expired air flows by the separate layers of film 33 from the header 36, the partial pressure driving force for $CO_2$, water vapor and $O_2$, between the outside air and the expired air causes $CO_2$ and water vapor to permeate to the outside, while $O_2$ permeates inwardly to regenerate the expired air, which is collected at manifold header 37 and returned to mask 31 via hose 38. The path travelled by the spent air may be lengthened by the use of baffles 39 extending between each set of films. Also positive circulation is insured by the use of a one-way valve (not shown) in hose 34.

Since permeation is actually a solution process in which the gases dissolve in the film and then diffuse through the film in the dissolved state, the film 33 forms a pore-free barrier to any solid, liquid or gas, which does not chemically dissolve in the silicone rubber.

The driving force required to circulate the expired air past the permeable film 33 is less than a tenth of an inch of water pressure, that mainly being the driving force required to actuate the light-weight check valve (not shown). This driving force is less than that required to pull gas through a dust filter, and this gives little discomfort to the wearer. Outside air is brought in contact with the permeable film 33 by ordinary gaseous diffusion, and by convection of the warmed outside air up through the channels 40 in pack 32, this air being warmed by the heat carried in a man's breath. As shown more clearly in FIG. 13 outside fluid channels (such as channels 40) will alternate with channels receiving the expired air.

As an example, approximately 10.5 square yards of one-mil silicon film may be carried in pack 32. This would be sufficient to maintain a wearer's inhaled air at an oxygen content of 16 percent and a carbon dioxide content of one percent, assuming he was walking at 2 m.p.h. (i.e. 400 cc. $O_2$/min. consumed). At this oxygen concentration he would be working at an oxygen partial pressure equivalent to that found at 7000 ft. above sea level.

Since the wearer does not have to carry an $O_2$ source or $CO_2$ absorber, or an adsorber for contaminants, he can use this oxygen regenerating and purifying system indefinitely without recharging or shutting down in any way. No recurring charge for chemicals will be necessary, and the initial cost of the film pack should be of the same order of magnitude as for present micro-porous filters. The pack is very light in weight, because of the reliable thinner silicon film now developed.

Such an air purifying system would be useful in the following environments:

(1) In manufacturing areas containing plutonium, thorium, or beryllium dust;
(2) In bacterial or germ-laden work areas;
(3) In dust-filled or pollen-filled areas;
(4) In smoke-filled areas, as long as $O_2$ was not depleted; or
(5) In areas contaminated with certain nerve gases.

Figure 9:
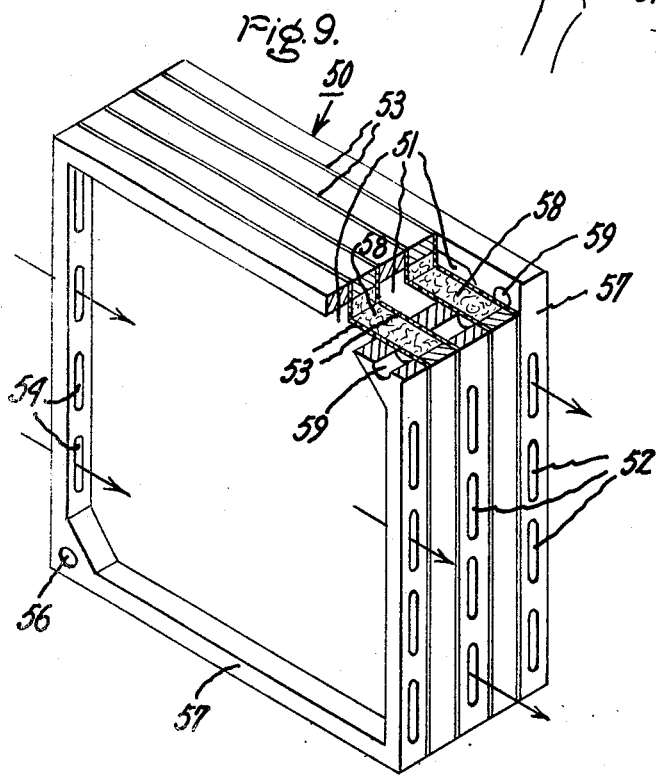
FIG. 9 is a more detailed three-dimensional view of the manner of mounting the permeable film for use in such arrangements as are illustrated in FIGS. 8 and 10.

FIG. 9 shows in some detail the manner in which a film pack 50 useable in the apparatus in FIG. 8 would be constructed. The film pack 50 is disposed so that air enters the open ends of alternate channels 51 via inlet holes 52, flows over the surfaces of silicone rubber permselective membrane 53 of optimum construction and exits from the unit 50 via holes 54. In transit the air yields oxygen to the breathing air and picks up $CO_2$ and water vapor therefrom. The output header 56 extends through the plurality of frame supports 57 for channels 51 and communicates with the breathing air chambers 58, which alternate with channels 51. In a similar fashion distribution header 59 extends through the frame supports 57 and communicates with the chambers 58 to supply the expelled air thereto to enable the requisite gas exchange to occur. In the usual construction porous packing 61 (e.g. leached urethane foam, glass fiber batting, corrugated cardboard, porous metal) is employed in chambers 58 to lend support to films 53 to prevent their collapse toward each other.

Another of the more important uses to which the permselective silicone rubber membranes of this invention can be put is to extract oxygen from water to support life. This particular means for obtaining air is especially adaptable for the supply of breathing air to submarines (as shown in FIGS. 10 and 11), which remain under water for indefinite periods of time. The capability of certain films with particular permeation capabilities to extract air from water depends upon the fact that the water of most oceans to a depth of about 100 meters, is saturated with atmospheric oxygen to from 90 to 105 percent the saturation value at standard conditions of temperature and pressure. To a certain extent, this process simulates the gills of a fish, except that in this case there is an extra gas phase present between the sea water and the blood stream.

In order to better understand how this gas extraction from water occurs, it is necessary to be cognizant of certain principles controlling the behavior of permeable films. Contrary to general belief the rate of permeation of a gas through a film is proportional to the activity gradient across the film, and is not proportional to the absolute pressure gradient. Activity may be related to pressure by an activity coefficient, which may be expressed as the ratio of the fugacity to the pressure and this ratio is equal to unity for an ideal gas. This term is more completely defined in the Textbook of Physical Chemistry—Glasstone (2nd ed.—Van Nostrand Company, Inc.—1946) on p. 301.

In the case wherein a liquid phase is present on one side of the film, the pressure and activity gradients can be greatly different, and it is really the activity gradient which controls the amount and direction of gas permeating a membrane. Thus, for a given membrane, if it be assumed that one side of a film is kept at zero pressure and liquid water at varying pressures is present on the other side of the same film, the rate at which the water will permeate through the film will remain substantially the same regardless of whether the water is at 0.1, 1, or 10 atmospheres of pressure for in each case the activity is approximately equal to the room temperature vapor pressure of water. Further, the permeation rate will remain substantially the same, even if water vapor at but a few centimeters of pressure is substituted for the liquid water on the high pressure side of the film. Therefore, for a given pressure on the low pressure side of a permeable membrane, the only way the actual permeation rate of water can be increased is to increase the temperature (and hence the saturation vapor pressure and activity) of the water on the high pressure side of the film. Similarly, if water is saturated with air at one atmosphere pressure, the total activity of the gaseous components in the water will remain essentially one atmosphere regardless of what the absolute pressure of the water may become.

Since sea water is saturated with air to a considerable depth, if the silicone rubber film 63 (FIG. 10) of this invention is supported so that one side thereof is exposed to a moving stream of water, while the other side thereof is continuously evacuated by compressor or pump 64, oxygen and nitrogen will be extracted from the water, permeating the membrane to the evacuated side. By compressing and then cooling the gas and vapor that has permeated film 63 a suitable air supply is provided and also some liquid water. This water is even desalinated, so that this method of air extraction not only extracts breathing air from sea water but also produces potable water as well. When the film 63 is of silicone rubber, the extracted air, which will be obtained will be enriched in oxygen, because of the higher permeability of oxygen through the silicone rubber film and also, because of the higher solubility of oxygen in sea water.

As a specific example, one can consider the case of a submarine with a ten-man crew and assume that on the average each man in the submarine consumes 400 cc. of oxygen per minute and generates 320 cc. of carbon dioxide per minute. The carbon dioxide concentration can be reduced in the crew quarters by any one of a number of methods, as for example, chemical adsorption, or by concentration and rejection. This is shown schematically in FIG. 11 as a flow diagram. The latter method may be effected by the use of films selectively permeable to carbon dioxide.

To maintain an atmosphere containing about 20 mole percent oxygen in the crew quarters of the submarine, about 21.1 liters per minute of air containing about 35 mole percent oxygen would have to be extracted from the sea water to sustain the ten-man crew. Based on the known permeability of silicone rubber films, this capacity would be provided by a permeator, or extractor unit 66 with an operating surface of 26 square yards of 0.5 to 1 mil silicone rubber film and with a flow of water through such a cell of about 75–100 cubic feet per minute. With the low pressure side of film 63 being operated at 1 cm. mercury, only about 300 watts of compressive work would have to be expended for a ten-man crew and this work demand can be further reduced by increasing the operating film area in the extractor unit 66. In addition to supplying the oxygen required for ten men, extractor 66 would also provide about 75 to 90 pounds of desalinated water per day as a useful byproduct.

As the large excess of air-saturated set water passes the face of silicone rubber membrane 63, the vacuum on the other side of the silicone rubber membrane induced by compressor 64 reduces the pressure so as to promote the permeation of water and oxygen and nitrogen through the membrane 63. As this gas is withdrawn from adjacent the membrane 63 it is compressed by compressor 64. Next, the water vapor in the gas is removed by cooling coils 67 and de-entrainer 68. The resulting air stream is oxygen-enriched, containing about 35 percent oxygen. The method for maintaining the oxygen and nitrogen balance with 35 percent oxygen feed to the crew quarters is shown in FIG. 11.

In the table, data on silicone rubber as a membrane material are provided.

TABLE I.—ROOM TEMPERATURE PERMEATION RATES IN SILICONE RUBBER

| Gas: | Pr. cc. gas NTP, cm. thick/sec., sq. cm., cm Hg |
|---|---|
| $N_2$ | $28 \times 10^{-9}$ |
| $O_2$ | $60 \times 10^{-9}$ |
| $CO_2$ | $320 \times 10^{-9}$ |
| $H_2O$ | $3800 \times 10^{-9}$ |
| $NH_3$ | $590 \times 10^{-9}$ |
| $H_2S$ | $650 \times 10^{-9}$ |
| $CH_4$ | $95 \times 10^{-9}$ |
| $C_3H_8$ | $410 \times 10^{-9}$ |
| $C_5H_{12}$ | $2000 \times 10^{-9}$ |
| $C_6H_6$ | $1910 \times 10^{-9}$ |
| Pyridine | $2100 \times 10^{-9}$ |

Therefore, by producing the novel composite film construction of this invention; namely, a silicone rubber permeable membrane of substantially reduced uniform thickness, yet free of perforations, whereby the area of membrane required to perform a given effectiveness of gas separation may now be markedly reduced, significant economies may be realized in weight and area of membrane in the construction of gas separation units. Also, the practicability of gas separation units is considerably enhanced by the development of this highly improved film material with its unique high permeation rates for $CO_2$ and water vapor as indicated in the table.

What I claim as new and desire to secure by Letters Patent of the United States is:

1. A thin, cured, solid, elastic, non-porous composite membrane consisting essentially of a consolidated plurality of layers of silicon rubber film in intimate bonded relationship over major surface areas thereof forming a laminate, said layers each being substantially free of perforations with such perforations as may occur in contiguous layers being out of register, said laminate being substantially free of channels interconnecting said out-of-register perforations and having a uniform thickness of less than about 2 mils whereby said laminate is non-porous with respect to gases.

2. The composite membrane substantially as recited in claim 1 wherein the layers are of convertible methylpolysiloxane.

3. A thin, cured, solid, elastic non-porous composite membrane consisting essentially of a consolidated plurality of laminae of silicon rubber film in intimate bonded relationship over major surface areas thereof forming a laminate with the interface between contiguous laminae being substantially free of entrapped air, said laminae each being substantially free of perforations with such perforations as may occur in contiguous laminae being out of register, said laminate having a uniform thickness of less than about 2 mils and being substantially free of channels interconnecting said out-of-register perforations whereby said composite is non-porous to gases.

4. The composite membrane substantially as recited in claim 3 wherein the laminae are of convertible methylpolysiloxane.

References Cited

UNITED STATES PATENTS

| 1,964,700 | 6/1934 | Winter et al. | 161—164 |
| 2,540,151 | 2/1951 | Weller et al. | 55—16 |
| 2,673,823 | 3/1954 | Biefeld et al. | 161—94 |
| 2,966,235 | 12/1960 | Kammermeyer | 55—16 |

OTHER REFERENCES

Organic Protective Coatings, Fischer et al., p. 305, Reinhold Publishing Corporation, 1953.

JOHN T. GOOLKASIAN, Primary Examiner

G. W. MOXON II, Assistant Examiner

U.S. Cl. X.R.

55—16; 161—164, 165, 206